United States Patent Office 3,402,211
Patented Sept. 17, 1968

3,402,211
PROCESS FOR THE PRODUCTION OF PERCHLORALLENE DIMERS
Günther Maahs, Marl, Germany, assignor to Chemische Werke Huls Aktiengesellschaft, Marl, Germany
No Drawing. Filed Dec. 23, 1963, Ser. No. 332,839
Claims priority, application Germany, Dec. 27, 1962, C 28,773; Feb. 28, 1963, C 29,266
17 Claims. (Cl. 260—648)

This invention relates to a novel process for the production of dimers of perchlorallene.

It is known that dimeric perchlorallene which is designated as $\delta\text{-}C_6\text{-}Cl_8$ (Lieb. Ann. d. Chem., 600, pages 1 ff. (1956)) can be produced by heating pentachloropropene with strong alkalies in organic solvents. With such a procedure only small yields are obtained, with the further disadvantage that the work has to be done at relatively high temperatures. It is also known that dimeric perchlorallene can also be produced by heating perchlorovinylacetic acid ethyl ester or its isomeric perchlorocrotonic acid ethyl ester with strong alkalies. Also with this reaction, which likewise requires high temperatures, only small yields of perchlorallene are obtained.

A principal object of this invention, therefore, is to provide processes which produce higher yields of dimeric perchlorallene, and are substantially devoid of the other disadvantages of the prior art.

Upon further study of the specification and claims other objects and advantages of the present invention will become apparent.

To attain these objects, it has been discovered that dimeric perchlorallene can be obtained in good yields if perchlorovinylacetyl chloride or perchlorocrotonyl chloride is reacted with (1) N,N-disubstituted carboxylic acid amides of lower aliphatic carboxylic acids, or (2) with non-substituted acid amides of lower aliphatic carboxylic acids preferably in the presence of tertiary organic nitrogenous bases or alkali carbonates, or (3) aliphatic, aromatic or heterocyclic carbonyl compounds, or (4) cyclic ethers, or (5) mixtures of such compounds.

The perchlorovinylacetyl chloride which is used as the starting material can be produced in any conventional way such as by chlorinating alkoxy pentachlorobutadiene which can be obtained, e.g., by reacting the inexpensive hexachlorobutadiene with alcoholates.

Of the N,N-disubstituted lower carboxylic acid amides which would be preferred for this reaction can be mentioned, e.g., dimethylformamide, diethylformamide, dimethylacetamide, diethylacetamide, and ethylphenylacetamide. The N,N-di-lower-akyl substituted formamides are especially suitable.

Preferred unsubstituted carboxylic acid amides are the lower carboxylic acid amides, e.g., formamide, acetamide, propionamide, or butyramide.

As carbonyl compounds, it is preferred to use lower alkyl ketones such as acetone, methylethyl ketone or diethyl ketone, or other compounds which contain a carbonyl group, e.g., acetic acid esters of lower alkanols, or lower alkyl aldehydes such as acetaldehyde, propionaldehyde, or aromatic aldehydes such as furfural or benzaldehyde.

Suitable cyclic ethers are, e.g., tetrahydrofuran and dioxane.

The compounds just mentioned are generally added in stoichiometric amounts of 1 mol per mol of perchloracetyl chloride or perchlorocrotonoyl chloride, although an excess of either reactant can be used, as in any chemical reaction.

The reaction with the N,N-disubstituted carboxylic acid amides can be performed without the addition of any organic solvents, but such solvents can be used advantageously. Suitable solvents are inert liquids such as the ethers, e.g., diethylether, dibutylether, or hydrocarbons such as petroleum ether, gasoline, benzene, toluene, or the reactants themselves, preferably the cyclic ethers.

In an especially suitable procedure the reaction is performed in the presence of a tertiary organic nitrogenous base, or in the presence of alkali carbonates. Suitable tertiary organic bases are, e.g., trimethylamine, triethylamine, dimethyl aniline, quinoline, tripropylamine, tributylamine. The alkali carbonates can be either the carbonates or bicarbonates such as sodium carbonate, potassium carbonate, ammonium carbonate, sodium bicarbonate and postassium bicarbonate. The ratio of the tertiary organic nitrogen base or carbonate to the other reactants is not critical, but it is preferred to employ at least equivalent amounts of the reactants.

The carbonyl compounds or cyclic ethers are preferably added in admixture with a minor quantity or water. The water is preferably added in such proportions that the ternary mixture of carbonyl compound or cyclic ether, water and perchlorocrotonyl chloride or perchlorovinylacetyl chloride remains homogenous. It can be used for regulating the reaction velocity. The procedure in which water is used is especially suitable for the reaction of perchlorovinylacetyl chloride or perchlorocrotonyl chloride with acetone in the presence of sodium carbonate.

Generally the reactants are slowly mixed at room temperature, whereupon they can be heated a short time to boiling, although in other cases it may be necessary to cool the mixture during the reaction. If organic bases are used, the reaction temperatures are advantageously kept between 20 and 80° C. and preferably between 30 and 50° C., whereas without these additions, the reaction temperatures are preferably kept between 50 and 150° C. and more advantageously between 60 and 100° C.

Since the reaction equilibrium is in favor of the formation of perchlorallene, the temperature does not substantially affect the outcome of the reaction, but merely its rate.

Additionally, the reaction pressure is of little consequence, the reaction being capable of being conducted under subatmospheric, atmospheric, and supraatmospheric pressures.

The preferred procedure is to add the perchlorovinylacetyl chloride or the perchlorocrotonyl chloride, a little at a time, to the solution of the other reactants. The perchlorovinylacetyl chloride or perchlorocrotonyl chloride that is added can be in admixture with a solvent or with another reactant.

For reaction with N,N-disubstituted carboxylic acid amides, the reactants are mixed, possibly with the addition of solvents, and the mixture warmed, or if necessary cooled during the reaction. It may be advantageous first to provide the N,N-disubstituted carboxylic acid amide and then add the perchlorovinylacetyl chloride or perchlorocrotonyl chloride a little at a time.

The reaction mixture is generally worked up by dilution with water and separation of the organic phase by extraction or by filtering off the precipitated salt. From the organic phase, after separation of the solvent, the dimeric perchlorallene is obtained. If the reaction is performed in the presence of alkali carbonates, it will be advantageous to select from the above-named solvents one that is not miscible with water.

The dimeric perchlorallene is suitable for fireproofing plastics by coating or mixing; or it can be used as an intermediate for the preparation of insecticides.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

Into a flask equipped with a reflux condenser, an agitator and a dropping funnel, 21.2 g. (0.2 mol) sodium carbonate are introduced; and 55.4 g. (0.2 mol) perchlorcrotonyl chloride dissolved in a mixture of 80 ml. acetone and 4 ml. water are slowly added drop-by-drop. After the vigorous reaction has subsided, the acetone is evaporated, the residue reacted with water, and the remaining undissolved dimeric perchlorallene filtered with suction and washed free from chloride. After drying, a 97.1% theoretical yield of 34.5 g. dimeric perchlorallene is obtained. After recrystallization from methanol, it melts at 91° C.

EXAMPLE 2

Into a similarly equipped flask 10.6 g. sodium carbonate (0.1 mol), 4.5 g. formamide (0.1 mol), and 20 ml. tetrahydrofuran are introduced; and 27.7 g. perchlorocrotonyl chloride (0.1 mol) are added drop-by-drop with stirring. After all of it is added, the mixture is heated to boiling, and then cooled, reacted with water, and the precipitated dimeric perchlorallene filtered with suction. A 97% theoretical yield of 17.2 g. crude dimeric perchlorallene is obtained, which after recrystallization melts at 92° C.

EXAMPLE 3

27.7 g. (=0.1 mol) perchlorocrotonic acid chloride (or perchlorvinylacetic acid chloride) are warmed with 100 ml. dimethyl formamide to 70° C. 1.5 hours under reflux. After cooling, the mixture is reacted with 200 ml. water, thoroughly extracted with ether, and the ether evaporated. The 11.5 g. of crude residue after recrystallization from methanol yields 6.5 g. pure dimeric perchlorallene, which is 36% of the theoretical yield. M.P. 91–92° C.

EXAMPLE 4

Into a mixture of 53 g. sodium carbonate (0.5 mol) in 100 ml. dimethyl formamide 138.5 g. (=0.5 mol) perchlorocrotonyl chloride are added drop-by-drop with cooling to keep the reaction temperature between 20 and 30° C. After no more $CO_2$ is produced, ether and water are added. From the aqueous phase 58.5 g. NaCl (100% theoretical) are obtained, while from the ether phase, after concentration and recrystallization from methanol, 86 g. (96.7% theoretical) dimeric perchlorallene are obtained. M.P. 92° C.

EXAMPLE 5

A mixture of 0.1 mol dimethyl formamide and 0.1 mol perchlorocrotonyl chloride in 100 ml. ether are added drop-by-drop to a suspension of 0.1 mol sodium carbonate in ether with cooling under reflux. The precipitated sodium chloride is filtered off and the ether evaporated. After recrystallization from methanol, 16.7 g. dimeric perchlorallene are obtained amounting to 94% of the theoretical. M.P. 92–93° C.

The preceding examples repeated with the other raw materials of this invention which have been generically and specifically described, yield similar results.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process for the preparation of dimeric perchlorallene, the step which comprises reacting at 20–150° C.: (1) a member of the group consisting of perchlorocrotonyl chloride and perchlorovinylacetyl chloride with (2) a member of the group consisting of an N,N-di-lower-alkyl amide of a lower carboxylic acid, N,N-ethyl-phenylacetamide, an unsubstituted amide of lower carboxylic acids, a lower alkyl ketone, an acetic acid ester of a lower alkanol, a lower alkyl aldehyde, furfural, benzaldehyde, tetrahydrofuran, and mixtures thereof, with the provision that, with members which are not amides, the reaction is conducted in the further presence of a member of the group consisting of a tertiary organic nitrogenous base, an alkali metal carbonate, an alkali metal bicarbonate, ammonium carbonate, and ammonium bicarbonate, wherein the tertiary organic nitrogenous base is selected from the group consisting of trimethyl amine, triethyl amine, dimethyl aniline, quinoline, tripropylamine and tributylamine.

2. The process of claim 1, wherein reactant (2) is dimethyl formamide.

3. The process of claim 1, wherein reactant (2) is formamide.

4. The process of claim 1, wherein reactant (2) is acetone.

5. The process of claim 1, wherein the reaction is conducted in the presence of sodium carbonate.

6. The process of claim 1 wherein the reaction is conducted in the further presence of a minor quantity of water, and with the provision that the resultant ternary mixture of reactants is homogeneous.

7. The reaction of claim 1, wherein the reaction temperature is 20–80° C.

8. The reaction of claim 1, wherein the reaction temperature is 30–50° C.

9. The reaction of claim 1, wherein the reaction temperature is 50–150° C.

10. The reaction of claim 1, wherein the reaction temperature is 60–100° C.

11. In a process for the preparation of dimeric perchlorallene, the step which comprises reacting at 20–150° C.: (1) a member of the group consisting of perchlorocrotonyl chloride and perchlorovinylacetyl chloride with (2) dimethyl formamide in the presence of sodium carbonate.

12. In a process for the preparation of dimeric perchlorallene, the step which comprises reacting at 20–150° C.: (1) a member of the group consisting of perchlorocrotonyl chloride and perchlorovinylacetyl chloride with (2) formamide in the presence of sodium carbonate.

13. In a process for the preparation of dimeric perchlorallene, the step which comprises reacting at 20–150° C.: (1) a member of the group consisting of perchlorocrotonyl chloride and perchlorovinylacetyl chloride with (2) acetone in the presence of sodium carbonate.

14. In a process for the preparation of dimeric perchlorallene, the step which comprises reacting at 20–150° C.: (1) a member of the group consisting of perchlorocrotonyl chloride and perchlorovinylacetyl chloride with (2) a member of the group consisting of an N,N-di-lower-alkyl amide of a lower carboxylic acid, N,N-ethylphenyl-acetamide, and an unsubstituted amide of lower carboxylic acids.

15. A process as defined by claim 14 wherein reactant (2) is an N,N-di-lower alkyl amide.

16. In a process for the preparation of dimeric perchlorallene, the step which comprises reacting at 20–150° C.: (1) a member of the group consisting of perchlorocrotonyl chloride and perchlorovinylacetyl chloride with (2) a member of the group consisting of a lower alkyl ketone, an acetic acid ester of a lower alkanol, a lower alkyl aldehyde, furfural, benzaldehyde, tetrahydrofuran, dioxane and mixtures thereof; (3) in the presence of a minor quantity of water wherein the proportion of water is such that the ternary mixture of (1), (2) and (3) is homogeneous, and in the further presence of a member of the group consisting of a tertiary organic nitrogenous base, an alkali metal carbonate, an alkali metal bicarbonate, ammonium carbonate, and ammonium bicarbonate, wherein the tertiary organic nitrogenous base is selected from the group consisting of trimethyl amine, triethyl amine, dimethyl aniline, quinoline, tripropylamine and tributylamine.

17. The process of claim 16 wherein the reaction is conducted in the presence of sodium carbonate.

References Cited

Maahs: Angew, Chem., Jahrg., 75 (1963), p. 451.

LEON ZITVER, *Primary Examiner*.